United States Patent
Zimmer et al.

(10) Patent No.: US 10,954,164 B2
(45) Date of Patent: Mar. 23, 2021

(54) FORMED HEXAGONAL BORON NITRIDE BODY, HEAT-TREATED HEXAGONAL BORON NITRIDE BODY AND PROCESSES FOR PRODUCING THE SAME

(71) Applicant: 3M INNOVATIVE PROPERTIES COMPANY, St. Paul, MN (US)

(72) Inventors: Jan C. Zimmer, Kempten (DE); Ursula Kayser, Buchenberg (DE); Krishna B. Uibel, Waltenhofen (DE); Christoph Lesniak, Buchenberg (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 3 days.

(21) Appl. No.: 16/323,454

(22) PCT Filed: Jul. 21, 2017

(86) PCT No.: PCT/US2017/043337
§ 371 (c)(1),
(2) Date: Feb. 5, 2019

(87) PCT Pub. No.: WO2018/026548
PCT Pub. Date: Feb. 8, 2018

(65) Prior Publication Data
US 2019/0177235 A1    Jun. 13, 2019

(30) Foreign Application Priority Data

Aug. 5, 2016 (EP) ..................... 16182962

(51) Int. Cl.
*C04B 35/583* (2006.01)
*C04B 35/103* (2006.01)
*C04B 35/626* (2006.01)

(52) U.S. Cl.
CPC .......... *C04B 35/583* (2013.01); *C04B 35/103* (2013.01); *C04B 35/62695* (2013.01); *C04B 2235/321* (2013.01); *C04B 2235/3201* (2013.01); *C04B 2235/3205* (2013.01); *C04B 2235/3206* (2013.01); *C04B 2235/3208* (2013.01); *C04B 2235/3218* (2013.01); *C04B 2235/3409* (2013.01); *C04B 2235/386* (2013.01); *C04B 2235/442* (2013.01); *C04B 2235/5292* (2013.01); *C04B 2235/5409* (2013.01); *C04B 2235/61* (2013.01); *C04B 2235/656* (2013.01); *C04B 2235/767* (2013.01); *C04B 2235/77* (2013.01)

(58) Field of Classification Search
CPC .......... C04B 35/583; C04B 2235/3205; C04B 2235/3208; C04B 2235/3201; C04B 2235/767; C04B 2235/61; C04B 2235/656; C04B 2235/442; C04B 2235/386; C04B 2235/3206
See application file for complete search history.

(56) References Cited

U.S. PATENT DOCUMENTS

| | | | | |
|---|---|---|---|---|
| 5,064,589 A * | 11/1991 | Ichikawa | .............. | C04B 35/583 |
| | | | | 264/122 |
| 5,320,989 A | 6/1994 | Chapman | | |
| 5,409,622 A | 4/1995 | Chapman | | |
| 6,299,805 B1 | 10/2001 | Friese | | |
| 6,893,601 B2 * | 5/2005 | Holcombe, Jr. | ...... | C04B 41/009 |
| | | | | 264/430 |
| 2014/0287244 A1 * | 9/2014 | Shin | .................. | H01L 21/02458 |
| | | | | 428/446 |
| 2014/0291607 A1 * | 10/2014 | Kim | .................... | H01L 29/1606 |
| | | | | 257/9 |

FOREIGN PATENT DOCUMENTS

| | | |
|---|---|---|
| DE | 102006040385 | 1/2007 |
| DE | 102007040578 | 3/2009 |
| DE | 102008062155 | 6/2010 |
| DE | 102014222365 | 5/2016 |
| EP | 0308873 | 3/1989 |
| EP | 0939066 | 9/1999 |
| EP | 3257810 | 12/2017 |
| JP | 61132564 | 6/1986 |

OTHER PUBLICATIONS

International Search report for PCT International Application No. PCT/US2017/043337, dated Sep. 25, 2017, 5 pages.

* cited by examiner

*Primary Examiner* — Noah S Wiese
(74) *Attorney, Agent, or Firm* — Thomas M Spielbauer

(57) ABSTRACT

Provided are materials for a formed body comprising hexagonal boron nitride and such formed bodies. Also provided are heat-treated formed body obtained by heat-treating the formed bodies. The invention further relates to processes for making the formed body and the heat-treated formed body.

13 Claims, No Drawings

FORMED HEXAGONAL BORON NITRIDE BODY, HEAT-TREATED HEXAGONAL BORON NITRIDE BODY AND PROCESSES FOR PRODUCING THE SAME

CROSS REFERENCE TO RELATED APPLICATIONS

This application is a national stage filing under 35 U.S.C. 371 of PCT/US2017/043337, filed Jul. 21, 2017, which claims the benefit of European Application No. 16182962.7, filed Aug. 5, 2016, the disclosure of which is incorporated by reference in their entirety herein.

TECHNICAL FIELD

The present invention relates to a formed hexagonal boron nitride body with a good mechanical stability, to a heat-treated formed hexagonal boron nitride body with a low content of water-soluble boron compounds and good sealing properties, to a material composition for making such a formed hexagonal boron nitride body, and to processes for making such a formed hexagonal boron nitride body and such a heat treated formed hexagonal boron nitride body.

BACKGROUND

Hexagonal boron nitride has a high temperature stability, is electrically insulating, is a solid lubricant and has a high thermal conductivity. Furthermore hexagonal boron nitride is used as raw material for the production of cubic boron nitride, it can be used for cosmetic purposes and as a release agent for metallurgical applications, and for further applications for example in the field of metallurgy. It is densified by hot-pressing in order to obtain sufficient mechanical stability and optionally sufficient density of formed bodies. The hot-pressed formed bodies are usually machined mechanically to the final shape.

Hexagonal boron nitride powder is technical synthesized by nitridation of boric acid in the presence of a nitrogen source. As a nitrogen source, ammonia can be used, and then usually calcium phosphate is used as a carrier material for the boric acid. An organic nitrogen source such as melamine and urea can also be used and can be reacted with boric acid or borates under nitrogen. The nitridation usually is carried out at a temperature of from 800° C. to 1200° C. The thereby obtained boron nitride is substantially amorphous, it is also known as turbostratic boron nitride. The amorphous boron nitride is transformed at higher temperatures of up to about 2100° C., preferably in a nitrogen atmosphere, into hexagonal, crystalline boron nitride. Often for this high temperature treatment crystallization additives are added to the amorphous boron nitride.

In the high temperature treatment, hexagonal boron nitride (hBN) is produced in the form of primary particles having a platelet shaped morphology. Typical sizes of the boron nitride platelets are in the range of 1 to 20 µm, but platelet sizes of up to 50 µm are also possible. Usually the hexagonal boron nitride is crushed or de-agglomerated after the high temperature treatment, in order to obtain powders that can be further processed for various applications. In further steps impurities can be removed selectively to obtain high purity hexagonal boron nitride.

To obtain mechanically strong bodies, hexagonal boron nitride powder is filled in molds and hot-pressed and thereby densified at high temperatures. Often the hexagonal boron nitride powder is granulated before it is hot-pressed, in order to increase the bulk density and to allow higher fillings of the molds, as non-granulated hexagonal boron nitride powders have usually low bulk densities of about 0.1 to 0.5 g/cm$^3$. The so produced hot-pressed bodies have a sufficient mechanical stability for producing solid shapes, which is usually done by mechanical machining.

Hot-pressing of boron nitride is a cost-intensive process, as for hot-pressing a special equipment is required where high temperatures of above 1800° C. and up to about 2200° C. and high uniaxial pressures of about 20 MPa can be applied in a protective gas atmosphere.

EP 0 939 066 A1 discloses a method to form pellets or agglomerates of high density boron nitride made of high-purity hexagonal boron nitride powder, with the operations of cold pressing and granulation repeated until the density of the pellets or agglomerates is above 1.86 g/cm$^3$. The obtained pellets are intended to be used for converting hexagonal boron nitride into cubic boron nitride and are mechanically weak.

DE 19 750 107 C1 discloses a boron nitride sealing body that is produced by using machined hot-pressed hexagonal boron nitride to which a binder has been added for dry-pressing. As a binder, aluminum phosphate can be used.

DE 10 2014 222 365 A1 discloses a method of manufacturing a seal for a sensor element, comprising the following steps: providing a ceramic material having at least boron nitride and boron trioxide with a proportion of boron trioxide with respect to the ceramic material of 2.0 wt.-% to 6.0 wt.-%, forming the ceramic material by pressing to a gasket, and thermal treatment of the seal at temperatures of 475 to 1250° C. The boron nitride material which is used for the disclosed method can be obtained, for example, by milling or machining of hot-pressed sintered parts.

DE 10 2008 062 155 A1 discloses a ceramic mass for producing a sintered hexagonal boron nitride body that is solidifiable in a pressureless thermal treatment, comprises hexagonal boron nitride, and a nano-scale powder based on oxides, hydroxides, oxyhydrates or compounds forming oxides under thermal treatment, of silicon and aluminum and of aluminum. The forming of the ceramic masses is done by extruding with a moisture content of 30 to 34 wt.-%.

U.S. Pat. No. 5,320,989 discloses a material and a method of forming a dried cake by mixing boron nitride powder with a source of aluminum oxide, for example a water-based colloidal aluminum oxide or peptized aluminum oxide monohydrate liquid. The dried cake can be subsequently pressureless sintered at a temperature of about 500° C. to about 1000° C.

JP61132564 discloses a normal pressure sintered body that is made from 40-80 wt.-% boron nitride and 20-60 wt.-% of a mixture of a composition of $Al_2O_3$ with $B_2O_3$ in a weight ratio of $Al_2O_3:B_2O_3=100:10$ to 5, granulated by spray drying, green shaped and pressureless sintered in a non-oxidative atmosphere at a temperature of 1600 to 1800° C. During sintering, the formation of aluminum borate $9Al_2O_3*2B_2O_3$ ($Al_{18}B_4O_{33}$) is reported.

The non-published European patent application no. 16174825.6 discloses a formed body comprising hexagonal boron nitride, wherein the formed body has a Brinell hardness of at least 2 HBW 2.5/2, and wherein the formed body is obtainable by a process at temperatures of at most 100° C. The formed body may further comprise water-soluble boron compounds.

When boron nitride formed bodies containing water-soluble boron compounds, such as boron oxide or boric acid, are exposed to humidity, then the water-soluble boron compounds will be leached out. In certain applications, for example sealing components for sensors, this is not desired, as boric acid is environmental hazardous, the porosity of the leached-out material will increase and therefore the mechanical stability will decrease.

Therefore, there is a need for hexagonal boron nitride formed bodies that are mechanically stable and that can be produced by a cost-efficient process without the need of hot-pressing, and that can be used as sealing components, and that have a reduced content of water-soluble boron compounds.

As used herein, "a", "an", "the", "at least one" and "one or more" are used interchangeably. Adding an "(s)" to a term means that the term should include the singular and plural form. E.g. the term "compound(s)" means one compound and more compounds (e.g. 2, 3, 4, etc.). The term "comprise" shall include also the terms "consist essentially of" and "consists of".

SUMMARY

The subject-matter of the invention is consequently a material composition comprising hexagonal boron nitride, a water-soluble boron compound and a further inorganic compound, wherein the further inorganic compound is able to split off a gaseous phase at a heat treatment at a temperature of at most 1000° C., and wherein the further inorganic compound is able to form with the water-soluble boron compound(s) a water-insoluble boron compound at a heat treatment at a temperature of 200-1000° C.

The subject-matter of the invention is furthermore a formed body comprising the material composition according to the invention. The formed body according to the invention comprises hexagonal boron nitride, a water-soluble boron compound and a further inorganic compound, wherein the further inorganic compound is able to split off a gaseous phase at a heat treatment at a temperature of at most 1000° C., and wherein the further inorganic compound is able to form with the water-soluble boron compound(s) a water-insoluble boron compound at a heat treatment at a temperature of 200-1000° C.

The subject-matter of the invention is also a heat-treated formed body obtained by heat-treating the formed body according to the invention at a temperature of 200-1000° C., wherein the heat-treated formed body comprises hexagonal boron nitride and the reaction product between the water-soluble boron compound and the further inorganic compound as described above, and wherein the reaction product is a water-insoluble boron compound.

The heat-treated formed body according to the invention comprises hexagonal boron nitride and the reaction product between a water-soluble boron compound and a further inorganic compound, wherein the further inorganic compound is able to split off a gaseous phase at a heat treatment at a temperature of at most 1000° C., and wherein the further inorganic compound is able to form with the water-soluble boron compound(s) a water-insoluble boron compound at a heat treatment at a temperature of 200-1000° C., and wherein the reaction product is formed if the reaction partners are heat treated at a temperature of 200-1000° C.

The subject-matter of the invention is also a process for making the formed body according to the invention wherein the process comprises the steps
(a) providing a powder comprising hexagonal boron nitride powder;
(b) generating at least one water-soluble boron compound by mechanically pre-treating the powder of step (a) and/or by adding at least one water-soluble boron compound to the powder provided in step (a), thereby obtaining a powder comprising hexagonal boron nitride powder and at least one water-soluble boron compound;
(c) adding to the powder of step (b) a further inorganic compound, wherein the further inorganic compound is able to split off a gaseous phase at a heat treatment at a temperature of at most 1000° C., and wherein the further inorganic compound is able to form with the water-soluble boron compound(s) a water-insoluble boron compound at a heat treatment at a temperature of 200-1000° C.;
(d) mixing the powder of step (b) and the further inorganic compound added in step (c), thereby obtaining a material composition comprising hexagonal boron nitride;
(e) optionally granulating the material composition of step (d), thereby obtaining a material composition comprising hexagonal boron nitride, wherein the material composition is granulated; and
(f) forming the material composition of step (d) or the material composition of step (e) into a shape.

The subject-matter of the invention is also a process for making the heat-treated formed body according to the invention wherein the process comprises the steps
(a) providing a powder comprising hexagonal boron nitride powder;
(b) generating at least one water-soluble boron compound by mechanically pre-treating the powder of step (a) and/or by adding at least one water-soluble boron compound to the powder provided in step (a), thereby obtaining a powder comprising hexagonal boron nitride powder and at least one water-soluble boron compound;
(c) adding to the powder of step (b) a further inorganic compound, wherein the further inorganic compound is able to split off a gaseous phase at a heat treatment at a temperature of at most 1000° C., and wherein the further inorganic compound is able to form with the water-soluble boron compound(s) a water-insoluble boron compound at a heat treatment at a temperature of 200-1000° C.
(d) mixing the powder of step (b) and the further inorganic compound added in step (c), thereby obtaining a material composition comprising hexagonal boron nitride;
(e) optionally granulating the material composition of step (d), thereby obtaining a material composition comprising hexagonal boron nitride, wherein the material composition is granulated;
(f) forming the material composition of step (d) or the material composition of step (e) into a shape, thereby obtaining a formed body; and
(g) heat-treating the formed body of step (f) at a temperature of 200-1000° C.

The formed body and the heat-treated formed body according to the invention are mechanically stable. They have a high degree of contour accuracy and high edge stability. The formed body and the heat-treated formed body being mechanically stable can be produced without the need of a cost-intensive high-temperature hot-pressing process.

The heat-treated formed body according to the invention has a lower content of water-soluble boron compounds than the formed body, as the content of water-soluble boron compounds is reduced by the formation of a water-insoluble boron compound.

The heat-treated formed body according to the invention as well as the formed body according to the invention have good sealing capabilities and a low leakage rate for gases.

As used herein, a "water-soluble boron compound" means that at least 4.5 g of boric acid from the water-soluble boron compound can be dissolved in 100 ml water at 23° C. during 1 hour. As used herein, a "water-insoluble boron compound"

means that less than 4.5 g of boric acid from the water-insoluble compound can be dissolved in 100 ml water at 23° C. during 1 hour.

DETAILED DESCRIPTION

The material composition and the formed body according to the invention comprise hexagonal boron nitride, a water-soluble boron compound and a further inorganic compound.

The further inorganic compound is able to split off a gaseous phase at a heat treatment at a temperature of at most 1000° C., and the further inorganic compound is able to form with the water-soluble boron compound(s) a water-insoluble boron compound at a heat treatment at a temperature of 200-1000° C. This means that the further inorganic compound splits off a gaseous phase when a heat treatment at a temperature of at most 1000° C. is performed, and the further inorganic compound forms with the water-soluble boron compound(s) a water-insoluble boron compound when a heat treatment at a temperature of 200-1000° C. is performed, but it is not necessary to perform a heat treatment in order to obtain the material composition or the formed body according to the invention. The heat treatment is performed in order to obtain the heat-treated formed body according to the invention.

Preferably, the gaseous phase is water and/or carbon dioxide. More preferably, the gaseous phase is water.

The water-soluble boron compound(s) can be oxygen containing boron compounds such as boric acid ($H_3BO_3$) and ammonium borates. Examples of ammonium borates are the ammonium pentaborate ($NH_4)B_5O_8$ or the hydrate thereof. At least one of these water-soluble boron compounds is present in the material composition and the formed body, it is also possible that a mixture of these water-soluble boron compounds is present in the material composition and the formed body.

The material composition and the formed body preferably do not contain boron oxide ($B_2O_3$) as boron oxide is preferably not added to the material composition, and it is not produced by the process for making the formed body. This is confirmed by X-ray measurements that do not show the diffraction lines of boron oxide.

The further inorganic compound can be a metal hydroxide or a metal oxyhydroxide, wherein the metal is preferably selected from the group consisting of aluminum, calcium and magnesium, or combinations thereof. These inorganic compounds split off water at a heat treatment at a temperature of at most 1000° C. The further inorganic compound can also be a carbonate or a hydrogen carbonate of the alkali metals and alkaline earth metals, for example calcium carbonate, calcium hydrogen carbonate, sodium carbonate or sodium hydrogen carbonate, or combinations thereof. These inorganic compounds split off carbon dioxide at a heat treatment at a temperature of at most 1000° C. It is also possible to use as further inorganic compound combinations of the compound(s) that split off water and of the compound(s) that split off carbon dioxide at a heat treatment at a temperature of at most 1000° C.

Preferably, synthetic inorganic compounds are used as further inorganic compound. The high purity and well-defined properties of particle size and particle morphology of the synthetic inorganic compounds guarantee reproducible microstructure and electrical insulation and sealing properties of the formed body and of the heat-treated formed body.

Preferably, the further inorganic compound is a hydroxide or a oxyhydroxide of aluminum, calcium or magnesium. For example, the further inorganic compound can be aluminum hydroxide ($Al(OH)_3$), or boehmite ($AlO(OH)$). More preferably, boehmite is used as further inorganic compound. Even more preferably, boehmite in the form of nano-scale particles is used as further inorganic compound. The mean particle size of the nano-scale particles is at most 100 nm.

The nano-scale particles of boehmite are commercially available as spray-dried products such as Disperal and Disperal P2 from Sasol Germany GmbH and can be dispersed in water by peptization in the presence of an acid. The resulting product is a boehmite sol with mean particle sizes of the dispersed particles below 100 nm. Disperal and Disperal P2 are hydrated boehmites, having physically bound water, additionally to the chemical bound water of the aluminum oxyhydroxide boehmite. Preferably, hydrated boehmite is used as further inorganic compound, more preferably in the form of nano-scale particles. The mean particle size of the nano-scale particles is at most 100 nm.

The material composition and the formed body may contain additional ingredients, besides hexagonal boron nitride, a water-soluble boron compound and the further inorganic compound. Additional ingredients can be, for example, inorganic additives in form of mineral or ceramic powders with a typical particle size ($d_{50}$) of 0.5 to 10 µm, depending on the intended use of the formed body. For example, additional ingredients can be oxide ceramics, for example aluminum oxide ($Al_2O_3$), silicon oxide ($SiO_2$) and magnesium oxide (MgO), carbide ceramics, for example silicon carbide (SiC), and nitride ceramics, for example silicon nitride ($Si_3N_4$) and aluminum nitride (AlN), and mixtures thereof.

The material composition and the formed body have a boron nitride content of at least 15% by weight, preferably at least 35% by weight, more preferably at least 55% by weight, based on the total weight of the material composition or respectively of the formed body. The material composition and the formed body preferably have a boron nitride content of at most 95%, more preferably at most 90%, more preferably at most 85% by weight, based on the total weight of the material composition or respectively of the formed body. In some embodiments, the material composition and the formed body have a boron nitride content of at least 55% and at most 85% by weight, based on the total weight of the material composition or respectively of the formed body.

The density of the formed body is at least 1.3 $g/cm^3$, preferably at least 1.6 $g/cm^3$. In some embodiments, the density of the formed body is at least 1.8 $g/cm^3$.

The relative density of the formed body is preferably at least 50% of the theoretical density of the formed body. More preferably, the relative density of the formed body is at least 60%, more preferably at least 70% of the theoretical density of the formed body. Typically, the relative density of the formed body can be 99% or less, or 95% or less, or 90% or less, of the theoretical density of the formed body.

The porosity of the formed body can be calculated from the relative density by the equation Porosity [%]=(100−relative density) [%]

The theoretical density of hexagonal boron nitride formed bodies is calculated by the powder density of the pure hexagonal boron nitride powder which is 2.25 $g/cm^3$ and the theoretical densities of the other components and their respective fractions in the composition of the formed body.

The formed body is mechanically stable and has good mechanical properties. Thus the formed body is stable for transportation. The compressive strength of the formed body preferably is at least 4 $N/mm^2$. More preferably, the compressive strength of the formed body is at least 8 N/mm², more preferably at least 10 N/mm². In some embodiments, the compressive strength of the formed body is at least 15 N/mm². In some other embodiments, the compressive strength of the formed body is at least 25 N/mm².

The compressive strength of the formed body is measured as maximum force before rupture of a test sample of the formed body, divided by the area of the test sample on which the load is applied. The compressive strength is measured in the pressure test. The pressure test is typically carried out with test samples having the dimensions 20×20×10 mm and being axially pressed with a pressure of 1250 bar. The pressure test can be carried out in a universal testing machine, for example in a universal testing machine type 1474.100 from Zwick GmbH & Co. KG, Germany. The pressure test is carried out at room temperature (23° C.). The pressure test can be carried out according to DIN 51104 with the following differences: the samples for which the pressure test is carried out are in direct contact with the pressure plates of the testing machine, the material of the pressure plates is not a ceramic material but a cemented carbide, and the size of the samples for which the pressure test is carried out is 20×20×10 mm.

The hardness of the formed body can be measured by the Brinell method according to DIN EN ISO 6506-1 (2013). The Brinell hardness of the formed body is at least 2 HBW 2.5/2. The designation "HBW 2.5/2" means that the measurement has been carried out with a Brinell sphere of diameter 2.5 mm and with a load of 2 kp. Preferably, the Brinell hardness of the formed body is at least 3 HBW 2.5/2, more preferably at least 4 HBW 2.5/2. In some embodiments, the Brinell hardness of the formed body is at least 5 HBW 2.5/2 or at least 7 HBW 2.5/2. The size of the samples for Brinell hardness measurement can be 20×20×10 mm.

The total content of the water-soluble boron compound(s) in the material composition and the formed body according to the invention can be expressed as content of boric acid in percent by weight, based on the total weight of the formed body. The total content of the water-soluble boron compound(s) of the material composition and the formed body is preferably at least 3% by weight, more preferably at least 5% by weight, more preferably at least 8% by weight, wherein the content of water-soluble boron compound(s) is expressed as content of boric acid in percent by weight, based on the total weight of the material composition or respectively of the formed body. In some embodiments, the total content of water-soluble boron compound(s) of the material composition and the formed body is at least 15% by weight, wherein the content of water-soluble boron compound(s) is expressed as content of boric acid in percent by weight, based on the total weight of the material composition or respectively of the formed body.

The content of water-soluble boron compound(s) can be expressed as content of boric acid ($H_3BO_3$) in percent by weight and can be determined by eluting the water-soluble boron compound(s) with water at room temperature and subsequent analysis by ICP-OES (Inductively Coupled Plasma Optical Emission Spectrometry) according to the method described in the following. Usually, the sample is used in the as delivered state. Formed and heat-treated formed bodies shall be milled to pass a 300 μm (50 mesh) sieve. During milling, the energy input shall be as low as possible to minimize sample oxidation and it has to be paid attention that no contamination with boron occurs from the milling tools. About 1 g of the homogenized sample (if necessary, milled as described above) is weighed into a 100 ml volumetric flask. After addition of around 80 ml of deionized water the volumetric flask is closed with a stopper and the content is mixed by shaking. The volumetric flask is filled up to volume with deionized water and the content is again mixed by shaking. The volumetric flask with the suspension remains at room temperature for one hour and is shaked every 10 minutes. The suspension is filtered through a membrane filter with a pore size of 0.45 microns. The clear filtrate is diluted with deionized water by a factor of 100. The boron concentration in this sample solution is measured by ICP-OES. The boron concentration shall be used to calculate the content of boric acid in percent by weight in the sample according to the following equation:

$$w(H_3BO_3) = \frac{5.72 \cdot C_M \cdot f \cdot V}{10 \cdot m_E}$$

wherein:
$w(H_3BO_3)$ is the content of water-soluble boron compounds, expressed as content of boric acid ($H_3BO_3$) in percent by weight;
CM is the boron concentration in the sample solution in μg/ml;
V is the volume of suspension in ml;
f is the dilution factor of the sample solution;
$m_E$ is the sample mass in mg;
5.72 is the conversion factor B to $H_3BO_3$.

The result is expressed as content of boric acid ($H_3BO_3$) in percent by weight, although the formed body may also or alternatively contain other water-soluble boron compound (s) such as ammonium borates.

The content of the further inorganic compound in the material composition and the formed body according to the invention preferably is at least 0.5% by weight, more preferably at least 4% by weight, more preferably at least 15% by weight, more preferably at least 25% by weight, based on the total weight of the material composition or respectively of the formed body. In some embodiments, the content of the further inorganic compound in the formed body is at least 50% by weight, based on the total weight of the material composition or respectively of the formed body.

As already described above, boehmite is preferably used as the further inorganic compound in the material composition and the formed body. If boehmite is used as further inorganic compound, the molar ratio of boehmite and water-soluble boron compound(s) in the material composition and in the formed body is preferably from 0.3:1 to 6:1, more preferably from 1:1 to 2:1. The molar ratio of boehmite and water-soluble boron compound(s) can be expressed as molar ratio of AlO(OH):$H_3BO_3$.

The heat-treated formed body according to the invention comprises hexagonal boron nitride and the reaction product between a water-soluble boron compound and a further inorganic compound. The further inorganic compound is able to split off a gaseous phase at a heat treatment at a temperature of at most 1000° C., and the further inorganic compound is able to form with the water-soluble boron compound(s) a water-insoluble boron compound at a heat treatment at a temperature of 200-1000° C. The reaction product between the water-soluble boron compound(s) and the further inorganic compound is formed if the reaction partners are heat-treated at a temperature of 200-1000° C.

The heat-treated formed body is obtained by heat-treating the formed body according to the invention at a temperature of 200-1000° C. The heat-treated formed body comprises hexagonal boron nitride and the reaction product between the water-soluble boron compound and the further inorganic compound as described above. The reaction product between the water-soluble boron compound and the further inorganic compound is a water-insoluble boron compound.

Preferably, the gaseous phase is water and/or carbon dioxide. More preferably, the gaseous phase is water.

The water-soluble boron compound and the further inorganic compound can be selected as described above for the material composition and the formed body.

The water-insoluble boron compound that is formed as reaction product between the water-soluble boron compound(s) and the further inorganic compound is preferably a water-insoluble borate, preferably a borate of aluminum, calcium or magnesium. If boehmite (AlO(OH)) is used as further inorganic compound, then the reaction product between the water-soluble boron compound(s) and the further inorganic compound is the aluminum borate $Al_4B_2O_9$. Preferably, the reaction product between the water-soluble boron compound(s) and the further inorganic compound is the aluminum borate $Al_4B_2O_9$. The aluminum borate $Al_4B_2O_9$ is a water-insoluble boron compound.

The aluminium borate $Al_4B_2O_9$ is formed according to the following reaction:

$$4AlO(OH) + 2H_3BO_3 \rightarrow Al_4B_2O_9 + 5H_2O \quad (I)$$

The aluminium borate $Al_4B_2O_9$ is also formed when aluminium hydroxide $(Al(OH)_3)$ is used as the further inorganic compound. If a hydroxide or oxyhydroxide of calcium or magnesium is used as the further inorganic compound, then a calcium borate or a magnesium borate is formed as the water-insoluble boron compound.

If a hydroxide or oxyhydroxide of aluminum has been used as further inorganic compound, the $Al_4B_2O_9$ phase can be detected by X-ray diffraction analysis after heat treatment of at least 730° C. in air and 2 hours dwelling time.

The heat-treated formed body may also contain a water-soluble boron compound. The total content of the water-soluble boron compound(s) in the heat-treated formed body can be expressed as content of boric acid in percent by weight and can be determined by eluting the water-soluble boron compound(s) with water at room temperature and subsequent analysis by ICP-OES according to the method described above for the formed body.

The total content of water-soluble boron compound(s) in the heat-treated formed body is preferably at most 15% by weight, expressed as content of boric acid in percent by weight, based on the total weight of the heat-treated formed body. More preferably, the total content of water-soluble boron compound(s) of the heat-treated formed body is at most 10%, even more preferably at most 8%, most preferably at most 5% by weight, expressed as content of boric acid in percent by weight, based on the total weight of the heat-treated formed body.

The water-soluble boron compound(s) in the heat-treated formed body can be decomposition products of boric acid and ammonium borates, such as metaboric acid or boric oxide, or boric acid that may have been formed by hydrolysis of boric oxide.

The heat-treated formed body may also contain aluminium oxide $(Al_2O_3)$. The aluminium oxide can be formed from boehmite by the heat-treatment of the formed body and can be present in the heat-treated formed body as an overstoichiometric quantity that may not have reacted with the water-soluble boron compound(s). The content of aluminium oxide is preferably at most 35% by weight, more preferably at most 20% by weight, more preferably at most 5% by weight, most preferably at most 2% by weight, based on the total content of the heat-treated formed body. If the hydroxides or oxyhydroxides of other metals than aluminum are used as further inorganic compound, then metal oxides of these other metals may also be present in the heat-treated formed body, for example calcium oxide or magnesium oxide.

Additionally to hexagonal boron nitride, the water-insoluble boron compound, water-soluble boron compound(s) and aluminum oxide, the heat-treated formed body may contain other inorganic non-metallic components. For example, the heat-treated formed body may contain mineral or ceramic powders, such as oxide ceramics, for example silicon oxide $(SiO_2)$ and magnesium oxide (MgO), carbide ceramics, for example silicon carbide (SiC), and nitride ceramics, for example silicon nitride $(Si_3N_4)$ and aluminum nitride (AlN), and mixtures thereof. Typically, the mean particle size $(d_{50})$ of the mineral or ceramic powders is from 0.5 to 10 µm.

As already described above, the reaction product between the water-soluble boron compound(s) and the further inorganic compound is formed if the reaction partners are heat-treated at a temperature of 200-1000° C. Preferably, the heat-treatment is performed at a temperature of 300-900° C., more preferably of 400-850° C., most preferably of 600-850° C.

The heat-treated formed body has a boron nitride content of at least 15% by weight, preferably at least 40% by weight, more preferably at least 60% by weight, based on the total weight of the heat-treated formed body. The heat-treated formed body preferably has a boron nitride content of at most 95%, more preferably of at most 90%, more preferably of at most 85% by weight, based on the total weight of the heat-treated formed body. In some embodiments, the heat-treated formed body has a boron nitride content of at least 60% and at most 85% by weight, based on the total weight of the heat-treated formed body.

The density of the heat-treated formed body is at least 1.3 g/cm³, preferably at least 1.4 g/cm³. In some embodiments, the density of the heat-treated formed body is at least 1.5 or 1.6 g/cm³.

The relative density of the heat-treated formed body is preferably at least 50% of the theoretical density of the heat-treated formed body. More preferably, the relative density of the heat-treated formed body is at least 55%, more preferably at least 60% of the theoretical density of the heat-treated formed body. Typically, the relative density of the heat-treated formed body can be 99% or less, or 95% or less, or 90% or less, of the theoretical density of the heat-treated formed body.

The porosity of the heat-treated formed body can be calculated from the relative density by the equation Porosity [%]=(100−relative density) [%]

The theoretical density of hexagonal boron nitride heat-treated formed body is calculated by the powder density of the pure hexagonal boron nitride powder which is 2.25 g/cm³ and the theoretical densities of the other components and their respective fractions in the composition of the formed body.

The heat-treated formed body is mechanically stable and has good mechanical properties. Thus the heat-treated formed body is stable for transportation. The compressive strength of the heat-treated formed body preferably is at least 4 N/mm². More preferably, the compressive strength of the heat-treated formed body is at least 10 N/mm², more preferably at least 15 N/mm². In some embodiments, the compressive strength of the heat-treated formed body is at least 20 N/mm² or at least 25 N/mm². The compressive strength is measured as maximum force before rupture of a test sample of the heat-treated formed body, divided by the area of the test sample on which the load is applied. The compressive strength is measured in the pressure test as described above for the formed body.

The hardness of the heat-treated formed body can be measured by the Brinell method according to DIN EN ISO 6506-1 (2013). The Brinell hardness of the heat-treated formed body is at least 2 HBW 2.5/2. The designation "HBW 2.5/2" means that the measurement has been carried out with a Brinell sphere of diameter 2.5 mm and with a load of 2 kp. Preferably, the Brinell hardness of the heat-treated formed body is at least 3 HBW 2.5/2, more preferably at least 5 HBW 2.5/2, most preferably at least 8 HBW 2.5/2. The size of the samples for Brinell hardness measurement can be 20×20×10 mm.

At room temperature the water-soluble boron compounds boric acid ($H_3BO_3$) and ammonium borates are solid. The ammonium borates decompose at about 100° C. to boric acid and ammonia. At about 100° C. boric acid begins to release hydrated water. In the released water boric acid can be dissolved and can be transported in water vapour, as a water vapour volatile compound. At higher temperatures up to about 170° C. the boric acid melts and starts to transform to metaboric acid ($HBO_2$). Metaboric acid itself is solid at about 200° C. By further increasing the temperature, metaboric acid melts at about 236° C. and starts to dehydrate above 300° C. and finally transforms to boric oxide at about 400° C. The transformation temperatures are dependent on the heating rate and on the partial pressure of water. Having boehmite, preferably hydrated boehmite, and boric acid in the material composition, further to the release of hydrated water from boric acid, additional water is released from the hydrated boehmite. Dehydration of the physically bound water of boehmite happens at about 100° C. and chemical decomposition of boehmite at about 400-450° C. The released water of boehmite, or of other hydroxides or oxyhydroxides, increases the mobility of boric acid and metaboric acid in formed bodies. By having boehmite or other hydroxides or oxyhydroxides, preferably hydrated boehmite, and boric acid in the material composition, the water content and the partial pressure of water at elevated temperatures is increased, and thereby the reverse reaction of decomposition products of boric acid such as metaboric acid is supported. This reverse reaction increases the temperature interval with highly mobile modifications of boron compounds and extends the time for highly mobile boron compounds such as metaboric acid and boric acid to diffuse to the outer areas of the formed body, for example if used as sealing component. The highly mobile boron compounds are either liquid or in the gaseous phase, dependent on the temperature. The highly mobile boron compounds at the outer areas of the sealing component fill gaps between the sealing component and the surrounding construction of the sealing component, and this leads to enhanced sealing properties and gas tightness. Subsequent to the sealing process by the highly mobile boron compounds, the highly mobile boron compounds react with boehmite to aluminum borate ($Al_4B_2O_9$) at temperatures above 600° C. The water-insoluble boron compound $Al_4B_2O_9$ is also formed at the interfaces of the sealing component with the surrounding construction. By this formation of a water-insoluble compound at the interfaces of the sealing component with the surrounding construction the gas tightness of the sealing component is improved, and also the stability of the sealing component against moisture is improved.

The mobility of boric acid and metaboric acid can be further increased if water releasing compounds like hydroxides and oxyhydroxides are used in combination with carbon dioxide releasing compounds like carbonates of alkali metals or alkaline earth metals as further inorganic compound in the material composition disclosed herein.

In order to evaluate the sealing properties of the formed body and of the heat-treated formed body, a test for gas tightness was performed. The test procedure for this test is described in the experimental section below. The leakage rate of the formed body and of the heat-treated formed body, as determined by this test procedure, is typically below 1000 μl/min, preferably below 500 μl/min, more preferably below 100 μl/min, most preferably below 40 μl/min.

The gas tightness of the formed body and of the heat-treated formed body is unexpected to one skilled in the art. Conventional pressed or isostatically pressed boron nitride powder typically has a porosity of 30-50%. The porosity of the formed body disclosed herein is typically about 10-30%, even subsequent to isostatically pressing at 4000 bar. The porosity increases during heat treatment at temperatures above 400° C. by decomposition of boehmite as decomposition products of boehmite and particularly of hydrated boehmite typically have a porosity of 30-50%. The decomposition products of other further inorganic compounds used herein also have a high porosity. One skilled in the art would not have chosen such a kind of material composition for a sealing element, due to the high porosity of the resulting formed bodies and heat-treated formed bodies. Surprisingly, the material composition disclosed herein leads to high gas tightness of the formed body and of the heat-treated formed body. The formed body and the heat-treated formed body can be used, for example as sealing component, at room temperature (23° C.), at room temperature to 100° C., at temperatures of 100-400° C., of 400-700° C., of 700-800° C., of 600-850° C. and of 800-1000° C.

The formed body according to the invention is obtainable by a process comprising the steps (a) providing a powder comprising hexagonal boron nitride powder;

(b) generating at least one water soluble boron compound by mechanically pre-treating the powder of step (a) and/or by adding at least one water-soluble boron compound to the powder provided in step (a), thereby obtaining a powder comprising hexagonal boron nitride powder and at least one water-soluble boron compound;

(c) adding to the powder of step (b) a further inorganic compound, wherein the further inorganic compound is able to split off a gaseous phase at a heat treatment at a temperature of at most 1000° C., and wherein the further inorganic compound is able to form with the water-soluble boron compound(s) a water-insoluble boron compound at a heat treatment at a temperature of 200-1000° C.;

(d) mixing the powder of step (b) and the further inorganic compound added in step (c), thereby obtaining a material composition comprising hexagonal boron nitride;

(e) optionally granulating the material composition of step (d), thereby obtaining a material composition comprising hexagonal boron nitride, wherein the material composition is granulated; and (f) forming the material composition of step (d) or the material composition of step (e) into a shape, thereby obtaining a formed body.

The heat-treated formed body according to the invention is obtainable by a process comprising the steps
(a) providing a powder comprising hexagonal boron nitride powder;
(b) generating at least one water-soluble boron compound by mechanically pre-treating the powder of step (a) and/or by adding at least one water-soluble boron compound to the powder provided in step (a), thereby obtaining a powder comprising hexagonal boron nitride powder and at least one water-soluble boron compound;
(c) adding to the powder of step (b) a further inorganic compound, wherein the further inorganic compound is able to split off a gaseous phase at a heat treatment at a temperature of at most 1000° C., and wherein the further inorganic compound is able to form with the water-soluble boron compound(s) a water-insoluble boron compound at a heat treatment at a temperature of 200-1000° C.;
(d) mixing the powder of step (b) and the further inorganic compound added in step (c), thereby obtaining a material composition comprising hexagonal boron nitride;
(e) optionally granulating the material composition of step (d), thereby obtaining a material composition comprising hexagonal boron nitride, wherein the material composition is granulated; and
(f) forming the material composition of step (d) or the material composition of step (e) into a shape, thereby obtaining a formed body; and
(g) heat-treating the formed body of step (f) at a temperature of 200-1000° C., thereby obtaining a heat-treated formed body.

In order to obtain the formed body according to the invention, a material composition comprising hexagonal boron nitride powder is formed into a shape. The material composition which is suitable for making the formed body is obtainable by a process comprising the steps
(a) providing a powder comprising hexagonal boron nitride powder;
(b) generating at least one water-soluble boron compound by mechanically pre-treating the powder of step (a) and/or by adding at least one water-soluble boron compound to the powder provided in step (a), thereby obtaining a powder comprising hexagonal boron nitride powder and at least one water-soluble boron compound;
(c) adding to the powder of step (b) a further inorganic compound, wherein the further inorganic compound is able to split off a gaseous phase at a heat treatment at a temperature of at most 1000° C., and wherein the further inorganic compound is able to form with the water-soluble boron compound(s) a water-insoluble boron compound at a heat treatment at a temperature of 200-1000° C.;
(d) mixing the powder of step (b) and the further inorganic compound added in step (c), thereby obtaining a material composition comprising hexagonal boron nitride;
(e) optionally granulating the material composition of step (d), thereby obtaining a material composition comprising hexagonal boron nitride, wherein the material composition is granulated.

The granulation step (e) is an optional step. Therefore, the material composition comprising hexagonal boron nitride powder which is suitable for making the formed body according to the invention can be a material composition for which a granulation step (e) has been carried out, but it is also possible to use the material composition obtained by steps (a) to (d) to make the formed body.

As a starting powder to be provided in step (a), commercially available hexagonal boron nitride powders may be used, preferably with a specific surface area (BET) of 1 to 15 m²/g. Also powders with a higher or lower specific surface area may be used. The mean particle size ($d_{50}$) of the hexagonal boron nitride powder may be from 0.2 to 50 µm, preferably from 0.5 to 25 µm, more preferably from 1 to 20 µm, even more preferably from 1 to 15 µm. The mean particle size ($d_{50}$) can be measured by laser diffraction (wet measurement, Master Sizer 2000, Malvern). Preferably, the total oxygen content of the hexagonal boron nitride powder is at most 10%, more preferably at most 8% and even more preferably at most 6%. In some embodiments, the total oxygen content of the hexagonal boron nitride powder is at most 5%, more preferably at most 4%. The oxygen content of the hexagonal boron nitride powder is partially related to oxygen bonded in the lattice of the boron nitride. An additional source of oxygen is related to water-soluble boron compounds such as boric acid ($H_3BO_3$) and ammonium borates.

The graphitization index of the starting powder to be provided in step (a) preferably is at least 1, more preferably at least 1.5, more preferably at least 2. The graphitization index is measured by powder X-ray diffraction.

The starting powder to be provided in step (a) comprises less than 50% by volume, preferably less than 20% by volume, based on the total volume of the starting powder, of a powder that has been obtained by machining or milling of hot-pressed hexagonal boron nitride sintered parts. More preferably, the starting powder to be provided in step (a) does not comprise a powder that has been obtained by machining or milling of hot-pressed hexagonal boron nitride sintered parts. Therefore, the formed body comprises less than 50% by volume, preferably less than 20% by volume, more preferably 0% by volume, based on the total volume of the formed body, of a powder that has been obtained by machining or milling of hot-pressed hexagonal boron nitride sintered parts. The graphitization index of powders that have been obtained by machining or milling of hot-pressed hexagonal boron nitride sintered parts is typically below 2. Hexagonal boron nitride powders that have been obtained from hot-pressed hexagonal boron nitride sintered parts by machining or by milling often contain impurities and hard agglomerates and are not well-defined in particle size and particle size distribution. As already explained above, hot-pressing of hexagonal boron nitride is a cost-intensive process. In the process for making the formed body disclosed herein, it is not necessary to use a powder which has been produced by the cost-intensive process of hot-pressing and milling or machining.

Preferably, the hexagonal boron nitride powder provided in step (a) is subjected to a pre-treatment in step (b). The pre-treatment comprises an energy input into the material, preferably a mechanical energy input. The input of mechanical energy may be done by vibrations or impacts or collisions. The mechanical pre-treatment may be a dry milling process, for example a dry ball milling process. For the dry milling process, any dry mill can be used, for example a ball mill, a dry agitated ball mill or a vibration mill. The atmosphere of the ball-milling process may be oxygen-containing or oxygen-free. The dry-milling is performed typically for at least 30 minutes up to 5 hours. By the pre-treatment, the mean particle size ($d_{50}$) of the hexagonal boron nitride powder may decrease, but it is also possible that the mean particle size remains unchanged or changes only slightly. The mean particle size is measured by laser diffraction (wet measurement, Mastersizer 2000, Malvern). The mean particle size ($d_{50}$) of the pre-treated hexagonal boron nitride powder may be from 0.2 to 50 µm, or from 0.5 to 25 µm, or from 1 to 20 µm, or from 3 to 20 µm.

Powder X-ray diffraction measurements of the pre-treated powder show the diffraction pattern of the hexagonal boron nitride crystal structure.

The specific surface area (BET) of the hexagonal boron powder undergoes an increase by the pre-treatment of step (b), by a factor of at least 1.5 times of the specific surface area (BET) of the starting material provided in step (a). Preferably, the factor of the increase of the specific surface area is at least 2, more preferably at least 5, most preferably at least 10. The specific surface area (BET) of the pre-treated powder obtained in step (b) is at least 12 m$^2$/g, preferably at least 15 m$^2$/g, more preferably at least 20 m$^2$/g, more preferably at least 25 m$^2$/g, more preferably at least 30 m$^2$/g. In some embodiments, the specific surface area (BET) has values of at least 50 m$^2$/g, or of at least 60 m$^2$/g, or of at least 70 m$^2$/g. In other embodiments, the specific surface area (BET) has values of at least 75 m$^2$/g, or of at least 80 m$^2$/g, or of at least 90 m$^2$/g, or of at least 100 m$^2$/g, or of at least 110 m$^2$/g, or of at least 120 m$^2$/g.

The pre-treated powder obtained by the mechanical pre-treatment of step (b) comprises at least one water-soluble boron compound. The water-soluble boron compound(s) are mainly oxygen containing boron compounds such as boric acid and ammonium borates. Examples of ammonium borates present in the pre-treated powder are ammonium pentaborate (NH$_4$)B$_5$O$_8$ or the hydrate thereof. Boric acid (H$_3$BO$_3$) and the ammonium pentaborate (NH$_4$)B$_5$O$_8$ can be detected by X-ray diffraction measurements. Preferably, the pre-treated powder does not contain boron oxide (B$_2$O$_3$) as boron oxide is preferably not added to the pre-treated powder, and it is not produced by the pre-treatment step. This is confirmed by X-ray measurements that do not show the diffraction lines of boron oxide.

It can be observed that the content of water-soluble boron compound(s) is increasing during the pre-treatment of step (b). The increase of the content of water-soluble boron compound(s) by the pre-treatment of step (b) can be as high as at least 1, 2, 5, 6 or 10% by weight, the content of water-soluble boron compound(s) being expressed as content of boric acid in percent by weight, based on the total weight of the pre-treated powder.

The mechanical pre-treatment of step (b) is an optional treatment. Preferably, a mechanical pre-treatment is performed. If the hexagonal boron nitride powder provided in step (a) is not subjected to a pre-treatment in step (b), at least one water-soluble boron compound is added to the hexagonal boron nitride powder, for example boric acid (H$_3$BO$_3$) or ammonium borates such as ammonium pentaborate (NH$_4$)B$_5$O$_8$ or the hydrate thereof. These water-soluble boron compounds can be added in powder form or as aqueous solution. It is also possible to add the water-soluble boron compounds as a mixture with the further inorganic compound that is added in step (c).

If the hexagonal boron nitride powder provided in step (a) is subjected to a pre-treatment in step (b), it is also possible to add at least one water-soluble boron compound to the pre-treated powder, before or after the pre-treatment.

The graphitization index of the pre-treated powder of step (b) preferably is at least 1, more preferably at least 1.5, more preferably at least 2, more preferably at least 2.5. The graphitization index can be increased by the pre-treatment, and the graphitization index of the pre-treated powder can have a value which is 0.2 plus the value of the starting powder or 0.5 plus the value of the starting powder or 1.0 plus the value of the starting powder. The graphitization index is measured by powder X-ray diffraction.

By the pre-treatment of step (b), small particles of a particle size far below 1 μm are formed. The formation of fines by the pre-treatment can be observed by scanning electron microscopy (SEM). The fines are sub-micron to nano-scale in size. Many of the fine particles have a particle size of 200 nm or less.

The total content of water-soluble boron compound(s) of the hexagonal boron nitride powder after the pre-treatment and of the powder obtained in step (b) is preferably at least 1% by weight, more preferably at least 2% by weight, more preferably at least 6% by weight, more preferably at least 10% by weight, more preferably at least 15% by weight, expressed as content of boric acid in percent by weight, based on the total weight of the hexagonal boron nitride powder after the pre-treatment or respectively of the powder obtained in step (b). The total content of water-soluble boron compound(s) is determined by eluting the water-soluble boron compound(s) with water at room temperature and subsequent analysis by ICP-OES according to the method described above for the formed body.

To the powder resulting from step (b), in the following process step (c) a further inorganic compound is added that is able to split off a gaseous phase at a heat treatment at a temperature of at most 1000° C.; and the further inorganic compound is able to form with the water-soluble boron compound(s) a water-insoluble boron compound at a heat treatment at a temperature of 200-1000° C.

Preferably, the gaseous phase is water and/or carbon dioxide. More preferably, the gaseous phase is water.

The further inorganic compound can be selected as described above for the material composition and the formed body.

The further inorganic compound can be added in powder form. It is also possible to add the further inorganic compound in the form of a sol or in the form of a slurry. The sol of the further inorganic compound can be a boehmite sol with mean particle sizes of the dispersed particles below 100 nm and can be obtained by dispersing commercially available spray-dried products such as Disperal and Disperal P2 from Sasol Germany GmbH. It is also possible to add these commercially available spray-dried products in powder form to the powder obtained from step (b). The slurry of the further inorganic compound can be obtained by dispersing the further inorganic compound, for example boehmite (AlO(OH)), magnesium hydroxide (Mg(OH)$_2$) or calcium hydroxide (Ca(OH)$_2$), in a solvent, preferably in water. If the further inorganic compound has been added in powder form, then the resulting material composition obtained in step (d) is in powder form. If the further inorganic compound has been added in the form of a sol or a slurry, then the resulting material composition obtained in step (d) is in the form of a wet powder, a slurry or in the form of a paste.

As already described above, if boehmite is used as the further inorganic compound, the molar ratio of boehmite and water-soluble boron compound(s) is preferably from 0.3:1 to 6:1, more preferably from 1:1 to 2:1. The molar ratio of boehmite and water-soluble boron compound(s) can be expressed as molar ratio of AlO(OH):H$_3$BO$_3$. The amount of further inorganic compound that is added in step (c) can be chosen corresponding to a selected molar ratio of AlO(OH): H$_3$BO$_3$. The content of water-soluble boron compound(s), expressed as content of H$_3$BO$_3$, can be taken from the analyzed content of water-soluble boron compound(s) of the powder obtained in step (b).

The molar ratio of AlO(OH):H$_3$BO$_3$ of 2:1 corresponds to the stoichiometric ratio of AlO(OH):H$_3$BO$_3$ that is needed for the chemical reaction of the following equation:

$$4\text{AlO(OH)} + 2\text{H}_3\text{BO}_3 \rightarrow \text{Al}_4\text{B}_2\text{O}_9 + 5\text{H}_2\text{O} \tag{I}$$

If Al(OH)$_3$ is used as further inorganic compound, the molar ratio of Al(OH)$_3$ and water-soluble boron compound(s) can be expressed as molar ratio of Al(OH)$_3$:H$_3$BO$_3$ and is preferably from 0.3:1 to 6:1, more preferably from 1:1 to 2:1.

As already described above, additionally to hexagonal boron nitride, at least one water-soluble boron compound, and the further inorganic compound, the material composition may contain other inorganic non-metallic components, for example mineral or ceramic powders, such as oxide ceramics, for example aluminum oxide (Al$_2$O$_3$), silicon oxide (SiO$_2$), and magnesium oxide (MgO), carbide ceramics, for example silicon carbide (SiC), and nitride ceramics, for example silicon nitride (Si$_3$N$_4$) and aluminum nitride (AlN), and mixtures thereof, with a typical mean particle size (d$_{50}$) of from 0.5 to 10 µm. The additional inorganic components can be added before and subsequent to the pre-treatment step, or in step (c).

After adding in step (c) the further inorganic compound to the powder of step (b) some additional water may be added for granulation in step (e), if the further inorganic compound has been added in powder form.

After adding the further inorganic compound in step (c), the powder of step (b) and the further inorganic compound added in step (c) are mixed, thereby obtaining in step (d) a material composition comprising hexagonal boron nitride. The mixing can be done for example in a blender or an Eirich mixer, if the material composition is in powder form, or in a suitable mixing aggregate for mixing the slurry or the paste, if the material composition is in the form of a slurry or a paste. For mixing the slurry, a paddle mixer or a dissolver can be used.

The content of the further inorganic compound in the material composition obtained in step (d) preferably is at least 0.5% by weight, more preferably at least 4% by weight, more preferably at least 15% by weight, more preferably at least 25% by weight, based on the total weight of the material composition. In some embodiments, the content of the further inorganic compound in the material composition is at least 50% by weight, based on the total weight of the material composition.

After the mixing, the obtained material composition may be pre-dried before granulation, for example if the granulation step is carried out as a dry granulation step.

The material composition of step (d) is further processed by optionally granulating the material composition in step (e). Preferably, a granulation step (e) is carried out after the mixing step (d). By granulation, granulates or agglomerates are produced. The granulation can be carried out by various granulation methods, a dry granulation process is possible but also granulation processes known in the art such as spray-drying or fluidized-bed drying.

For dry granulation, a certain amount of water can be added, preferably in an amount of up to 15 wt.-%, more preferably up to 12 wt.-%, more preferably up to 8 wt.-%, more preferably up to 7 wt.-%, based on the total weight of the material composition. Most preferably, the amount of water added is from 0.5 to 7 wt.-%, based on the total weight of the material composition. If the water content of the mixture exceeds 20 wt.-%, a pre-drying step has to be performed below 80° C. A possible method for dry granulation is compacting the evenly mixed material with a roller compactor at least one time. For roller compaction, the material composition of step (d) is fed between two counter rotating rolls with a typical gap width of 400 to 1600 µm. Preferably, the material composition of step (d) is fed continuously between the two counter rotating rolls. After roller compaction, the material is crushed and screened in order to obtain the material composition of step (e). This can be done by processing the material through screen breakers. The sieve width of the screen breakers may be for example from 0.5 to 5 mm. To generate an even more free-flowing granulate, the material can be forced through a sieve, for example with a sieve width of 200 µm, preferably followed by a sieving step to remove the fines, for example the fines below 50 µm. The fines can be recycled to the granulating step.

For spray drying, a slurry with a solids content of about 15-35 wt.-% can be prepared. For example, the slurry can be prepared by dispersing the powder obtained in step (b) in a boehmite sol by stirring. Spray-drying can be carried out in air at a temperature of 200-250° C. No additional organic binders are needed. The spray-dried agglomerates can be sieved to remove the coarse particles, for example with a sieve having a sieve width of 315 µm, giving a free-flowing well compactable granulated powder. The fines are separated by a cyclone and can be recycled for spray-drying.

The granulated material composition thus obtained in step (e) can be used for forming it into a shape in order to obtain the formed body of step (f). If no granulation step (e) is carried out, the material composition obtained in step (d) can be directly used for the forming step (0.

The bulk density of the granulated material composition obtained in step (e) preferably is at least 0.5 g/cm$^3$, more preferably at least 0.6 g/cm$^3$. In some embodiments, the bulk density is at least 0.7 g/cm$^3$, or at least 0.8 g/cm$^3$.

The moisture content of the granulated material composition obtained in step (e) preferably is 15% by weight or less, more preferably 12% by weight or less, more preferably 8% by weight or less, more preferably 7% by weight or less, based on the total weight of the granulated material composition. Preferably, the moisture content of the granulated material composition is at least 0.2% by weight, based on the total weight of the material composition. Typically, the moisture content of the granulated material composition is from 0.2% to 7% by weight, based on the total weight of the granulated material composition. The moisture content can be determined with a moisture balance, after keeping a sample at a temperature of 80° C. for 24 hours.

The granulate size of the material composition obtained in step (e) is preferably below 1000 µm, more preferably below 500 µm. In some embodiments, the granulate size is 200 µm and less. In some embodiments, the granulate size may be from 50 to 200 µm. The granulate size from 50 to 200 µm means a granulate powder that has been obtained by sieving, i.e. by removing the fines by sieving with a sieve width of 50 µm and by removing the coarse granulates by sieving with a sieve width of 200 µm. In spray-dried powders, the granulate size is below 350 µm. The mean particle size d$_{50}$ of the spray-dried granulates is typically from 50 to 70 µm. The mean particle size d$_{50}$ is measured by laser diffraction (dry measurement, Mastersizer 2000, Malvern).

In step (f), the material composition obtained in step (d) or (e) is formed into a shape, thereby obtaining a formed body. Preferably, the material composition obtained in step (e) is formed into a shape. The forming is performed preferably by a pressing step, preferably by dry pressing, for example cold-isostatic pressing, typically with pressures of 1000 bar up to 4000 bar, or uniaxial pressing, typically with pressures of 500 bar up to 1500 bar. The forming can be carried out at temperatures from 10 to 40° C., preferably at room temperature (23° C.).

For the forming step (f), the addition of binders or pressing additives such as organic pressing additives, for example polyvinyl alcohol and polyethylene glycol, is not required. Preferably, for the forming step no pressing additives are used. Therefore, the material composition obtained in step (d) or (e), the formed body obtained in step (f) and the heat-treated body obtained in step (g) preferably do not contain pressing additives, and preferably are free of organic additives. The material composition, the formed body and the heat-treated formed body according to the invention preferably do not contain pressing additives, and preferably are free of organic additives.

If the optional granulation step (e) is performed, the forming process of step (f) is carried out with a low compaction factor. The compaction factor is defined by the ratio of the volume of the granulated material composition before forming to the volume of the formed body after forming. The compaction factor can also be calculated by the ratio of the bulk density of the granulated material composition before forming to the geometrical density of the formed body after forming. The low compaction factor observed in step (f) is unusual for boron nitride powders. The compaction factor for commercially available boron nitride powders typically is more than 5 or more than 10, for formed bodies with a density of 70% to 80% of theoretical density. The compaction factor for the material composition of step (e) is typically at most 5, preferably at most 3, more preferably at most 2.7. The compaction factor can be determined with a forming pressure of 1200 bar or 17405 psi, for formed bodies with a density of 70% to 85% of theoretical density.

A low compaction factor for the powder used for the forming step is useful because this results in shorter cycle times for pressing, and the venting of the pressing mold is improved. The pressing can be performed with commercially available pressing equipment. Small-volume components can be produced with high-speed presses with an output rate of more than 100 pieces per minute.

After forming, the formed hexagonal boron nitride body can be mechanically machined. It is also possible to have a near net shape forming process, i.e. the formed body can be obtained directly by the forming step without the need of further mechanically machining.

After the forming step (f) and the optional mechanical machining, the formed body can be heat treated in step (g). The heat treatment can be conducted in inert atmosphere. The heat treatment can also be conducted at atmospheric pressure and in air. The heat treatment can be carried out at a temperature of 200° C.-1000° C., preferably of 300-900° C., more preferably of 400-850° C., most preferably of 600-850° C. Preferably, the heat treatment is conducted at atmospheric pressure and in air at a temperature of 200-850° C., preferably of 400-850° C., more preferably of 600-850° C. The dwell time can be 1 hour or 2 hours or more. The heat-treated formed body will remain mechanically stable while increasing the temperature up to at most 1000° C. At temperatures beyond 1035° C., $Al_4B_2O_9$ will decompose into $B_2O_3$ and $Al_{18}O_4O_{33}$ according to the $Al_2O_3$—$B_2O_3$ phase diagram.

While raising the temperature, the water-soluble boron compounds like boric acid and ammonium borates will split off water vapor, and the further inorganic compound will split off a gaseous phase such as carbon dioxide or water vapor, and a water-insoluble boron compound is formed. If boehmite is used as further inorganic compound, boehmite will split off water vapor while raising the temperature, and the aluminum borate $Al_4B_2O_9$ is formed. The dehydration and the separation of carbon dioxide causes weight loss and leads to increasing porosity, but no shrinkage will occur. The weight loss of the formed body is in the range of 1 to 30 wt.-%. At a temperature of 600° C. the process of dewatering is completed.

When performing the heat treatment at temperatures from above 200° C., the hardness and compressive strength of the formed body does not change significantly up to 1000° C. in inert atmosphere. Up to about 850° C., the heat treatment can be performed in air.

When performing the heat treatment at temperatures up to 1000° C. in inert atmosphere and up to 850° C. in air, the content of water-soluble boron compound(s) will decrease due to the formation of the water-insoluble boron compound.

During the heat treatment at temperatures of 200-1000° C., the volume of the formed body increases. The volume expansion is remnant, the volume of the heat-treated formed body does not decrease again after cooling down. The volume expansion can by calculated as follows:

$$\text{Remnant volume expansion} = ((V2-V1)/V1)*100\%$$

wherein
V1 is the volume before heat treatment; and
V2 is the volume after heat treatment.

When performing a heat treatment at temperatures of 200-1000° C., the remnant volume expansion of the formed body is more than 0%, preferably at least 1%. In some embodiments, the remnant volume expansion is at least 3% or at least 5%. The remnant volume expansion can be measured on formed bodies having dimensions of 20×20×10 mm and that have been formed by axial pressing with a pressure of 1250 bar, by measuring the volume before and after heat treatment.

It is necessary to have a sufficient amount of hexagonal boron nitride in the formed body and in the heat-treated formed body, as hexagonal boron nitride shows the behavior of a remnant expansion when a heat treatment is performed, and the remnant expansion of the formed body is only observed if a sufficient amount of hexagonal boron nitride is present in the formed body. The remnant expansion improves the sealing properties of the formed body used as sealing component, as gaps with the surrounding construction are closed during the heat-treatment of the formed body and even the thermal expansion of the surrounding construction can be compensated. The remnant expansion in combination with the mobility enhancement of boric acid by water release of the further inorganic compound leads to unexpected good sealing properties of the formed body and of the heat-treated formed body. This leads to a force- and form-locking connection of the formed body and of the heat-treated formed body with the surrounding construction when used as sealing component.

If less than 15% by weight of boron nitride is present in the formed body, the remnant expansion will not be observed. With less than 15% by weight of boron nitride in the material composition or in the formed body, other ceramic materials such as oxide and non-oxide materials would be wetted at a heat treatment by boric acid, i.e. by the highly mobile boron compounds, and shrinkage of the formed body would happen during heat treatment. By the shrinkage of the formed body, existing gaps to the surrounding construction would grow and gas tightness would be strongly reduced.

The content of water-soluble boron compound(s) in the heat-treated formed body is lower than the content of water-soluble boron compound(s) in the formed body. This reduction of water-soluble boron compound(s) is due to the fact that $Al_4B_2O_9$ is less soluble than the water-soluble boron compound(s). The factor of reduction $f_{RED}$ of the water-soluble boron compound(s) can be calculated as follows:

$$f_{RED}=a_1/a_2$$

wherein $a_1$ is the content of water-soluble boron compound(s) in the formed body (before heat-treatment), expressed as content of boric acid in percent by weight, based on the total weight of the formed body;

$a_2$ is the content of water-soluble boron compound(s) in the heat-treated formed body, expressed as content of boric acid in percent by weight, based on the total weight of the heat-treated formed body.

The content of water-soluble boron compound(s) in the formed body and in the heat-treated formed body is measured by ICP-OES as described above.

The factor of reduction $f_{RED}$ of the water-soluble boron compound(s) is more than 1, preferably at least 1.2, more preferably at least 1.5, more preferably at least 2.0.

It is possible to shape the material composition obtained in step (e) directly to a formed body in a sealing construction or in a heating cartridge. In this case the formed body is directly produced in the sealing position or in the heating cartridge, and the forming step (f) is carried out directly in the sealing position or in the heating cartridge. The heat treatment of step (g) at a temperature of 200-1000° C. can be carried out for the formed body together with the sealing construction or the heating cartridge. If the forming step (f) is carried out directly in the sealing position or in the heating cartridge, it is also possible to use the material composition obtained in step (e) for which additionally a heat treatment has been carried out at a temperature of 200-1000° C.

The formed hexagonal boron nitride body and the heat-treated formed body can be used as or for producing electrically isolating parts, for example electrically isolating parts for furnace manufacturing or electrically isolating parts for high temperature applications. These electrically isolating parts have the advantage of being free of organic additives. The formed hexagonal boron nitride body can also be used as or for producing sealing components, for example as sealing component for sensors, and as or for producing heating cartridges and automotive components such as engine components or exhaust gas components.

It is also possible to use the formed body and the heat-treated formed body as a sealing component in contact to additional sealing element(s). For this purpose a stack with additional sealing element(s) in contact with the formed body or heat-treated formed body can be used. The additional sealing element(s) can for example be made of pressed parts of boehmite or of the other further inorganic compounds used herein.

The invention will be described in more detail by the following examples.

EXAMPLES

Experimental

Measurement of Leakage Rate

For investigation of the sealing performance of the formed body and of the heat-treated formed body, the following test procedure for gas tightness was performed.

A tube consisting of stainless steel was prepared, having an inner diameter of 9 mm, an outer diameter of 30 mm, a length of 70 mm. At both ends of the tube are internal screw threads with an inner diameter of >9 mm, and external screw threads for connection of air pressure supply for the leakage test.

The boron nitride granulated material composition is formed into a cylindrical formed body with a diameter of 8.9 mm and a height of 9 mm by dry pressing with a force of 7 kN. This formed body is inserted into the tube. Inside the stainless steel tube, on both ends of the formed body, cylindrical stainless steel bodies with a diameter of 8.9 mm are placed for transferring the load. One end of the tube is closed with a screw, using the inside thread, thereby fixing the formed body on this end of the tube. The other end is closed with a screw having a longitudinal bore hole of 6.5 mm, using the inside thread. After both screws have been tightened gently, the formed body in the tube is pressed with a force of 20 kN, using a pin with 6 mm diameter, which was inserted into the 6.5 mm bore hole of the screw in order to transfer force from a hand press to the formed body. While applying the pressure, the screw can be retightened, because the height of the formed body is reduced. After the pin has been removed from the bore hole, the leakage rate can be determined with the sealed tube thus obtained as follows.

One external screw thread is used to connect an air pressure supply of 4 bars, applying air pressure on the sealed tube. The air that passes through the formed body is quantitatively received by a flexible hose connected to the external screw thread on the other end of the sealed tube. The amount of the air that passes through is measured with a burette that is headfirst put into a water filled vessel. The burette collects the air from the flexible hose, which leads to a drop of the water-level in the burette. The drop of water level is recorded as a function of time and gives a straight line, showing that the leakage rate is constant. The gradient of the straight line gives the leakage rate of the sealed tube and of the formed body in μl/min.

After measuring the leakage rate of the formed body, the sealed tube is heat treated in a furnace at atmospheric pressure to a temperature of 730° C. with a dwell time of 1 h. After natural cool-down, the leakage rate of the heat-treated formed body is measured with the method described above.

Preparation of Boehmite Sol Based on Disperal (for Examples 2-5)

The boehmite sol is prepared by peptizing the commercially available product "Disperal" (Sasol Germany GmbH) in water. Disperal is a powder consisting of granules having a granule size of $d_{50}$=15 μm which can be peptized in water/$HNO_3$ resulting in particles with a size of 40 nm. The peptized particles consist of crystallites of 10 nm which contain aluminum oxyhydrate (AlO(OH)) and physically bound water. Disperal has an aluminum oxide yield of 77% by weight (supplier information). The content of pure, water-free AlO(OH) in Disperal is calculated to be 90.6 wt %.

The preparation of boehmite sol based on Disperal is carried out as follows: 1000 ml of deionized water is heated in a beaker to a temperature above 80° C. while stirring. 300 g of Disperal powder is added and homogenized for 10 minutes, keeping the temperature above 80° C. 17 g of nitric acid (65%) is added slowly and the dispersion is stirred for at least another 10 minutes, until the fluid appears transparent. The solids content of the so prepared boehmite sol is 23.1 wt.-% Disperal, the AlO(OH) content is 20.9 wt.-%.

Preparation of Boehmite Sol Based on Disperal P2 (for Example 1)

The boehmite sol is prepared by peptizing the commercially available product "Disperal P2" (Sasol Germany GmbH) in water. Disperal P2 is a powder consisting of granules having a granule size of $d_{50}$=45 μm which can be peptized in water/$HNO_3$ resulting in particles with a size of 20 nm. The peptized particles consist of crystallites of 4.5 nm, which contain aluminum oxyhydrate (AlO(OH)) and physically bound water. Disperal P2 has an aluminum oxide yield of 72% by weight (supplier information). The content of pure, water-free AlO(OH) in Disperal is calculated to be 84.7 wt.-%.

The preparation of boehmite sol based on Disperal P2 is carried out as follows: 1000 ml of deionized water is heated in a beaker to a temperature above 80° C. while stirring. 90.5 g of Disperal P2 is added and homogenized for 10 minutes, keeping the temperature above 80° C. 22.5 g of nitric acid (65%) is added slowly and the dispersion is stirred for at least another 10 minutes, until the fluid appears transparent. The solids content of the so prepared boehmite sol is 8 wt.-% Disperal P2, the AlO(OH) content is 6.8 wt %.

Example 1

A hexagonal boron nitride powder (3M™ Boron Nitride Powder Grade S1X) with a specific surface area of 11.9 $m^2$/g, a mean particle size ($d_{50}$) of 3 μm and a content of water-soluble boron compound(s) of 9% by weight (expressed as content of $H_3BO_3$) is used as starting powder. This powder is pre-treated as described in the following. The starting powder is filled into a vibration mill (Vibratom Typ 125, Siebtechnik GmbH, Malheim, Germany), together with hard metal milling-balls with an average diameter of 10 mm. The container of the vibration mill is filled up to ⅔ with milling balls, and about 20-40 kg of starting powder are added. The vibration mill is run for 45 minutes with the starting powder and the milling balls. After this pre-treatment in the vibration mill the specific surface area rises to 36.8 $m^2$/g and the content of water-soluble boron compound(s) (expressed as content of $H_3BO_3$) of the hexagonal boron nitride powder has increased up to a value of about 17% by weight. The molar ratio of AlO(OH) to the water-soluble compound(s) (expressed as $H_3BO_3$) is selected to be 2:1, taking the $H_3BO_3$ content of the pre-treated powder (17 wt.-%) into account. 17.1 wt.-% of the pre-treated powder are mixed with 82.9 wt.-% of the boehmite sol based on Disperal P2, and then additional 4.1 wt.-% deionized water are added and homogeneously mixed for 10 minutes. The granulation is carried out via spray drying (Niro, Mobile Minor 2000). The generated granules are sieved with a sieve having a sieve width of 315 μm to remove coarse particles, the medium particle size is 57 μm ($d_{50}$). The cyclone fines are recycled and re-used for the granulating step. The so produced granules have a bulk density of 0.77 g/$cm^3$ (see table 1).

The granules are uniaxial dry-pressed into a 20×20 mm mold with a force of 50 kN. The compaction factor is 2.35. The obtained formed body with the dimensions 20×20×10 mm shows a geometrically determined density of 1.81 g/$cm^3$. A remaining porosity of 19.8% is present. The formed body has a compressive strength of 28.9 MPa and a hardness of 7.4 HBW 2.5/2 (see table 1) and is good to handle with respect to the stability of edges. The content of water-soluble boron compound(s) of the formed body is 9.3 wt.-%.

For samples with the dimensions 20×20×10 mm a heat treatment is performed at 730° C. at atmospheric atmosphere for 1 h in a furnace (Nabertherm GmbH, Germany, HT40/17S) and naturally cooled down, thereby obtaining heat-treated formed bodies. The density of the formed bodies having the dimensions 20×20×10 mm has decreased by the heat-treatment to 1.6 g/$cm^3$, and the porosity has increased to 32.2%. The results of compressive strength and Brinell hardness measurements of the heat-treated formed body are shown in table 1. The volume of the formed body has increased by the heat treatment, a remnant expansion in volume of 1.3% is observed. The content of water-soluble boron compound(s) after heat treatment has decreased to 3.9 wt.-%. The formation of $Al_4B_2O_9$ is observed by X-ray diffraction when heated to 730° C. after a dwell time of at least 2 hours.

For the formed body and the heat-treated formed body, the leakage rate was measured following the procedure described above. The leakage rate of the formed body is 0 μl/min, the leakage rate of the heat-treated formed body is 32 μl/min.

The composition and experimental results are summarized in table 1.

Example 2

For example 2, the same pre-treated powder is used as in example 1. The molar ratio of AlO(OH) to water-soluble compound(s) (expressed as $H_3BO_3$) is selected to be 1:1, taking the $H_3BO_3$ content of the pre-treated powder (17 wt.-%) into account. 56 wt.-% of the pre-treated powder are mixed with 44 wt.-% of the boehmite sol based on Disperal in an Eirich mixer for 10 minutes at 1200 rpm. Subsequently this material composition is put into a drying-furnace at 60° C. until the water content has decreased to 19.1 wt.-%. The water content is determined by the weight loss of a 10 g sample after keeping the sample for 15 minutes at 125° C.

The granulation is carried out as a dry granulation with a roller compactor (RC 100 PHARMA from Powtec, Remscheid, Germany). For roller compaction, the dried material composition is continuously fed between two counter rotating structured rolls. The rolls are structured with 1.2 mm deep axial rounded grooves distributed along the circumference of the rolls with a distance of about 10 mm to each other. The two counter rotating rolls have a gap width of 400-1600 μm and are pressed with a pressure of about 150 bar against each other while rotating with 10 rpm. The roller-compacted material is processed through screen-breakers with a mesh width of 1000 μm (80 rpm). These two steps are repeated 5 times. To generate an even better free flowing granulate, the material is forced through a sieve with a sieve width of 200 μm. The so produced granulated material composition has a bulk density of 0.65 g/$cm^3$ (see table 1).

The granulated material composition is uniaxially dry-pressed into a 20×20 mm mold with a force of 50 kN. The compaction factor is 2.6. The obtained formed body with the dimensions 20×20×10 mm shows a geometrically determined density of 1.70 g/$cm^3$. A remaining porosity of 21.5% is present. The formed body has a compressive strength of 8.8 MPa and a Brinell hardness of 3.4 HBW 2.5/2 (see table 1). The content of water soluble boron compound(s) of the formed body is 16.6 wt.-%.

For samples with the dimensions 20×20×10 mm a heat treatment is performed at 730° C. at atmospheric atmosphere for 1 h in a furnace (Nabertherm GmbH, Germany, HT40/17S) and naturally cooled down, thereby obtaining heat-treated formed bodies. The density of the formed body has decreased by the heat-treatment to 1.5 g/cm$^3$, and the porosity has increased to 34.1%. The volume of the formed body has increased by the heat treatment, a remnant expansion in volume of 4.3% is observed. The content of water-soluble boron compound(s) after heat treatment has decreased to 7.6 wt.-%. The formation of $Al_4B_2O_9$ is observed by X-ray diffraction. The composition and experimental results are summarized in table 1.

Example 3

For example 3, the same pre-treated powder is used as in example 1. The molar ratio of AlO(OH) to water-soluble compound(s) (expressed as $H_3BO_3$) is selected to be 4:1. 23.8 wt.-% of the pre-treated powder are homogeneously mixed with 76.2 wt.-% of boehmite sol based on Disperal in an Eirich mixer for 10 minutes at 1200 rpm. The material composition is dried at 60° C. until the water content has decreased to 9.3 wt.-%. The material composition is granulated as in example 2. The forming of the granulated powder composition is carried out by dry-pressing as in example 2, and the obtained formed body is subjected to a heat treatment as in example 2.

The content of water-soluble boron compound(s) of the formed body is 6.6 wt.-%. The volume of the formed body has increased by the heat treatment, a remnant volume expansion of 3.8% is observed. The content of water-soluble boron compound(s) after heat treatment has decreased to 3.0 wt.-%. The composition and experimental results are summarized in table 1.

Example 4

For Example 4, the same pre-treated powder is used as in example 1. The molar ratio of AlO(OH) to water-soluble compound(s) (expressed as $H_3BO_3$) is selected to be 6:1. 17.2 wt.-% of the pre-treated powder are homogeneously mixed with 82.8 wt.-% of boehmite sol based on Disperal in an Eirich mixer for 10 minutes at 1200 rpm. The material composition is dried at 60° C. until the water content has decreased to 12.7 wt.-%. The material composition is granulated as in example 2. The forming of the granulated material composition is carried out by dry-pressing as in example 2, and the obtained formed body is subjected to a heat treatment as in example 2.

The content of water-soluble boron compound(s) of the formed body is 5.7 wt.-%. The volume of the formed body has increased by the heat treatment, a remnant volume expansion of 1.6% is observed. The content of water-soluble boron compound(s) after heat treatment has decreased to 3.9 wt.-%.

For the formed body and the heat-treated formed body, the leakage rate was measured following the procedure described above. The leakage rate of the formed body is 3 µl/min, the leakage rate of the heat-treated formed body is 700 µl/min.

The composition and experimental results are summarized in table 1.

Example 5

A commercially available high purity hexagonal boron nitride powder (3M™ Boron Nitride Powder Grade S1) with a specific surface area of 13 m$^2$/g, a mean particle size ($d_{50}$) of 3 µm, a graphitization index of 3.7 and a content of water-soluble boron compound(s) of not more than 0.08% by weight is used as starting powder. A pre-treatment of this powder is carried out as described in example 1. By this pre-treatment, the specific surface area reaches 45 m$^2$/g and the content of water-soluble boron compound(s) of the hexagonal boron nitride powder has increased up to a value of 6.2% by weight (expressed as $H_3BO_3$).

The molar ratio of AlO(OH) to water-soluble compound(s) (expressed as $H_3BO_3$) is selected to be 0.6:1. 50.2 wt.-% of the pre-treated powder is homogeneously mixed with 10.7 wt.-% of boric acid in powder form ($d_{50}$=100 µm) and with 39.1 wt.-% of boehmite sol based on Disperal in an Eirich mixer for 10 minutes at 1200 rpm. The material composition is dried at 60° C. until the water content has decreased to 7.8 wt.-%. The material composition is granulated as in example 2. The forming of the granulated material composition is carried out by dry-pressing as in example 2, and the obtained formed body is subjected to a heat treatment as in example 2.

The content of water-soluble boron compound(s) of the formed body is 18.3 wt.-%. The volume of the formed body has increased by the heat treatment, a remnant volume expansion of 5.6% is observed. The content of water-soluble boron compound(s) after heat treatment has decreased to 12.4 wt.-%.

For the formed body and the heat-treated formed body, the leakage rate was measured following the procedure described above. The leakage rate of the formed body is 4 µl/min, the leakage rate of the heat-treated formed body is 435 µl/min.

The composition and experimental results are summarized in table 1.

Comparative Example 1

For comparative example 1, the same pre-treated powder is used as in example 2. 93 wt.-% of the pre-treated powder are homogeneously mixed with 7 wt.-% of deionized water in an Eirich mixer for 10 minutes at 1200 rpm. No boehmite or other further inorganic compound is added. The obtained powder is granulated as in example 2. The forming of the granulated powder is carried out by dry-pressing as in example 2, and the obtained formed body is subjected to a heat treatment as in example 2.

The content of water-soluble boron compound(s) of the formed body is 15.5 wt.-%. The volume of the formed body has increased by the heat treatment, a remnant volume expansion of 8.1% is observed. The content of water-soluble boron compound(s) after heat treatment has increased to 17.2 wt.-%.

For the formed body and the heat-treated formed body, the leakage rate was measured following the procedure described above. The leakage rate of the formed body is 0 µl/min, the leakage rate of the heat-treated formed body is 48 µl/min.

The Brinell hardness of the heat-treated formed body measured with 1 kp is 2.1 HBW 2.5/1, due to the low hardness it was not possible to measure the hardness with 2 kp as for the other examples.

The composition and experimental results are summarized in table 1.

Comparative Example 2

For comparative example 2, the same pre-treated powder is used as in example 5. The molar ratio of AlO(OH) to water-soluble compound(s) (expressed as $H_3BO_3$) is selected to be 2:1. 5.5 wt.-% of the pre-treated powder is homogeneously mixed with 27.7 wt.-% of boric acid in powder form ($d_{50}$=100 μm), with 59.8 wt.-% of commercially available Disperal powder (Sasol Germany GmbH, mean granule size $d_{50}$=15 μm) and with 7 wt.-% of deionized water in an Eirich mixer for 10 minutes at 1200 rpm. The material composition is granulated as in example 2. The forming of the granulated material composition is carried out by dry-pressing as in example 2, and the obtained formed body is subjected to a heat treatment as in example 2.

The content of water-soluble boron compound(s) of the formed body is 25.1 wt.-%. The volume of the formed body has decreased by the heat treatment, a shrinkage in volume of 1.1% is observed. The content of water-soluble boron compound(s) after heat treatment has decreased to 5.7 wt.-%.

For the formed body and the heat-treated formed body, the leakage rate was measured following the procedure described above. The leakage rate of the formed body is 0 μl/min, the leakage rate of the heat-treated formed body is higher than 5000 μl/min, corresponding to the observed shrinkage of the formed body.

The composition and experimental results are summarized in table 1.

TABLE 1

| sample | starting composition | | | | granulated material composition | formed body (before heat treatment) | | | | compressive |
|---|---|---|---|---|---|---|---|---|---|---|
| | BN [wt.-%] | $H_3BO_3$ * [wt.-%] | AlO(OH) [wt.-%] | molar ratio AlO(OH):$H_3BO_3$ * | bulk density [g/cm³] | $H_3BO_3$ ** [wt.-%] | density [g/cm³] | porosity [%] | hardness [HBW 2.5/2] | strength [MPa] |
| Example No. | | | | | | | | | | |
| 1 | 59.7 | 12.2 | 28.1 | 2 | 0.77 | 9.3 | 1.81 | 19.8 | 7.7 | 28.9 |
| 2 | 70.2 | 14.4 | 15.4 | 1 | 0.65 | 16.6 | 1.70 | 21.5 | 3.4 | 8.8 |
| 3 | 48.0 | 9.8 | 42.2 | 4 | 0.81 | 6.6 | 1.69 | 28.7 | 4.2 | 9.7 |
| 4 | 39.6 | 8.1 | 52.3 | 6 | 0.83 | 5.7 | 1.72 | 30.2 | 4.0 | 7.9 |
| 5 | 67.5 | 19.8 | 12.7 | 0.6 | 0.82 | 18.3 | 1.73 | 17.1 | 4.7 | 15.7 |
| Comparative Example No. | | | | | | | | | | |
| 1 | 83.0 | 17.0 | 0 | 0 | 0.83 | 15.5 | 1.67 | 18.4 | 3.6 | 8.9 |
| 2 | 5.5 | 30.1 | 64.3 | 2 | 0.82 | 25.1 | 1.57 | 29.8 | 7.7 | 31.0 |

| sample | formed body (before heat treatment) leakage rate [μl/min] | heat treated formed body | | | | | | |
|---|---|---|---|---|---|---|---|---|
| | | $H_3BO_3$ ** [wt.-%] | density [g/cm³] | porosity [%] | hardness [HBW2.5/2] | compressive strength [MPa] | leakage rate [μl/min] | remant volume expansion [%] |
| Example No. | | | | | | | | |
| 1 | 0 | 3.9 | 1.58 | 32.2 | 8.6 | 31.7 | 32 | 1.3 |
| 2 | n.d. | 7.6 | 1.53 | 34.1 | 3.2 | 13.1 | n.d. | 4.3 |
| 3 | n.d. | 3.0 | 1.45 | 43.9 | 2.0 | 5.0 | n.d. | 3.8 |
| 4 | 3 | 3.9 | 1.49 | 45.0 | 2.0 | 4.7 | 700 | 1.6 |
| 5 | 4 | 12.4 | 1.47 | 35.4 | 3.9 | 13.3 | 435 | 5.6 |
| Comparative Example No. | | | | | | | | |
| 1 | 0 | 17.2 | 1.50 | 31.7 | 2.1 *** | 11.5 | 48 | 8.1 |
| 2 | 0 | 5.7 | 1.24 | 56.7 | 4.6 | 12.1 | >5000 | −1.1 |

\* $H_3BO_3$ relates to the total amount of water-soluble boron compound(s) that results from the pretreated powder (measured by ICP-OES as disclosed herein and expressed as content of boric acid in wt.-%) and from added boric acid \*\* $H_3BO_3$ relates to the content of water-soluble boron compound(s), measured by ICP-OES as disclosed herein and expressed as content of boric acid in wt.-%

\*\*\* measured with 1 kp instead of 2 kp n.d. = not determined

Exemplary embodiments include the following:

Embodiment 1

A material composition comprising hexagonal boron nitride, a water-soluble boron compound and a further inorganic compound, wherein the further inorganic compound is able to split off a gaseous phase at a heat treatment at a temperature of at most 1000° C., and wherein the further inorganic compound is able to form with the water-soluble boron compound(s) a water-insoluble boron compound at a heat treatment at a temperature of 200-1000° C.

Embodiment 2

The material composition according to embodiment 1, wherein the gaseous phase is water and/or carbon dioxide, preferably water.

Embodiment 3

The material composition according to embodiment 1 or 2, wherein the further inorganic compound is selected from
a metal hydroxide or a metal oxyhydroxide, the metal being preferably selected from the group consisting of aluminum, calcium and magnesium, or
a carbonate or a hydrogen carbonate of the alkali metals or alkaline earth metals, or combinations thereof;
and wherein the further inorganic compound preferably is boehmite.

Embodiment 4

The material composition according to any of embodiments 1 to 3, wherein the content of the further inorganic compound is at least 0.5% by weight, more preferably at least 4% by weight, more preferably at least 15% by weight, more preferably at least 25% by weight, based on the total weight of the material composition or respectively of the formed body.

Embodiment 5

The material composition according to any of embodiments 1 to 4, wherein the further inorganic compound is boehmite, and wherein the molar ratio of boehmite and water soluble boron compound(s) is from 0.3:1 to 6:1, more preferably from 1:1 to 2:1, and wherein the molar ratio of boehmite and water soluble boron compound(s) is expressed as molar ratio of $AlO(OH):H_3BO_3$.

Embodiment 6

The material composition according to any of embodiments 1 to 5, wherein the boron nitride content is at least 15% by weight, preferably at least 35% by weight, more preferably at least 55% by weight, based on the total weight of the material composition.

Embodiment 7

A formed body comprising the material composition of any of embodiments 1 to 6.

Embodiment 8

The formed body according to embodiment 7, wherein the formed body has a compressive strength of at least 4 $N/mm^2$, preferably at least 8 $N/mm^2$, more preferably at least 10 $N/mm^2$, and wherein the compressive strength is measured as maximum force before rupture of a test sample of the formed body, divided by the area of the test sample on which the load is applied.

Embodiment 9

The formed body according to embodiment 7 or 8, wherein the formed body has a Brinell hardness of at least 2 HBW 2.5/2, preferably at least 3 HBW 2.5/2, more preferably at least 4 HBW 2.5/2, and wherein the Brinell hardness is measured according to DIN EN ISO 6506-1 (2013).

Embodiment 10

The formed body according to any of embodiments 7 to 9, wherein the remnant volume expansion of the formed body is more than 0%, preferably at least 1% when performing a heat treatment at temperatures of 200-1000° C.

Embodiment 11

A heat-treated formed body obtained by heat-treating the formed body of any of embodiments 7 to 10 at a temperature of 200-1000° C., wherein the heat-treated formed body comprises hexagonal boron nitride and the reaction product between the water-soluble boron compound and the further inorganic compound as described in any of the preceding claims, and wherein the reaction product is a water-insoluble boron compound.

Embodiment 12

The heat-treated formed body according to embodiment 11, wherein the reaction product between the water-soluble boron compound and the further inorganic compound is a water-insoluble borate, preferably a borate of aluminum, calcium or magnesium, more preferably a borate of aluminum, more preferably the aluminum borate $Al_4B_2O_9$.

Embodiment 13

The heat-treated formed body according to embodiment 11 or 12, wherein the compressive strength of the heat-treated formed body is at least 4 $N/mm^2$, preferably at least 10 $N/mm^2$, more preferably at least 15 $N/mm^2$, and wherein the compressive strength is measured as maximum force before rupture of a test sample of the formed body, divided by the area of the test sample on which the load is applied.

Embodiment 14

The heat-treated formed body according to any of embodiments 11 to 13, wherein the heat-treated formed body has a Brinell hardness of at least 3 HBW 2.5/2, preferably at least 5 HBW 2.5/2, most preferably at least 8 HBW 2.5/2, and wherein the Brinell hardness is measured according to DIN EN ISO 6506-1 (2013).

Embodiment 15

The heat-treated formed body according to any of embodiments 11 to 14, further comprising a water-soluble boron compound, wherein the total content of the water-soluble boron compound(s) is at most 15% by weight, preferably at most 10% by weight, more preferably at most 8% by weight, most preferably at most 5% by weight, expressed as content of boric acid in percent by weight, based on the total weight of the heat-treated formed body.

Embodiment 16

The heat-treated formed body according to any of embodiments 11 to 15, wherein the heat-treated formed body has a boron nitride content of at least 15% by weight, preferably at least 40% by weight, more preferably at least 60% by weight, based on the total weight of the heat-treated formed body.

Embodiment 17

A process of making the formed body of any of embodiments 7 to 10, wherein the process comprises the steps
(a) providing a powder comprising hexagonal boron nitride powder;
(b) generating at least one water soluble boron compound by mechanically pre-treating the powder of step (a) and/or by adding at least one water-soluble boron compound to the powder provided in step (a), thereby obtaining a powder comprising hexagonal boron nitride powder and at least one water-soluble boron compound;
(c) adding to the powder of step (b) a further inorganic compound, wherein the further inorganic compound is able to split off a gaseous phase at a heat treatment at a temperature of at most 1000° C., and wherein the further inorganic compound is able to form with the water-soluble boron compound(s) a water-insoluble boron compound at a heat treatment at a temperature of 200-1000° C.;
(d) mixing the powder of step (b) and the further inorganic compound added in step (c), thereby obtaining a material composition comprising hexagonal boron nitride;
(e) optionally granulating the material composition of step (d), thereby obtaining a material composition comprising hexagonal boron nitride, wherein the material composition is granulated; and
(f) forming the material composition of step (d) or the material composition of step (e) into a shape.

Embodiment 18

A process for making the heat-treated formed body of any of embodiments 11 to 16, wherein the process comprises the steps
(a) providing a powder comprising hexagonal boron nitride powder;
(b) generating at least one water soluble boron compound by mechanically pre-treating the powder of step (a) and/or by adding at least one water-soluble boron compound to the powder provided in step (a), thereby obtaining a powder comprising hexagonal boron nitride powder and at least one water-soluble boron compound;
(c) adding to the powder of step (b) a further inorganic compound, wherein the further inorganic compound is able to split off a gaseous phase at a heat treatment at a temperature of at most 1000° C., and wherein the further inorganic compound is able to form with the water-soluble boron compound(s) a water-insoluble boron compound at a heat treatment at a temperature of 200-1000° C.;
(d) mixing the powder of step (b) and the further inorganic compound added in step (c), thereby obtaining a material composition comprising hexagonal boron nitride;
(e) optionally granulating the material composition of step (d), thereby obtaining a material composition comprising hexagonal boron nitride, wherein the material composition is granulated; and
(f) forming the material composition of step (d) or the material composition of step (e) into a shape, thereby obtaining a formed body; and
(g) heat-treating the formed body of step (f) at a temperature of 200-1000° C.

Embodiment 19

The process according to embodiment 17 or 18, wherein the mechanical pre-treatment of step (b) is a dry milling process.

Embodiment 20

Use of the formed body of any of embodiments 7 to 10 or of the heat-treated formed body of any of embodiments 11 to 16
as or for producing electrically isolating parts,
as or for producing sealing components,
as or for producing heating cartridges, or
as or for producing automotive components.

The invention claimed is:

1. A formed body comprising a material composition, the material composition comprising hexagonal boron nitride, a water-soluble boron compound selected from the group consisting of boric acid ($H_3BO_3$) and ammonium borates, and boehmite, wherein as expressed as a molar ratio of AlO(OH): $H_3BO_3$, the molar ratio of boehmite to the water-soluble boron compound is from 0.3:1 to 6:1, wherein the boehmite is able to split off a gaseous phase at a heat treatment at a temperature of at most 1000° C., and is able to form, with the water-soluble boron compound, a water-insoluble boron compound at a heat treatment at a temperature of 200-1000° C.;
wherein the gaseous phase is water, carbon dioxide, or a combination thereof.

2. The formed body of claim 1, wherein the content of the boehmite in the material composition is at least 0.5% by weight, based on the total weight of the formed body.

3. The formed body of claim 1, wherein the molar ratio of boehmite to the water soluble boron compound in the material composition is from 1:1 to 2:1 expressed as a molar ratio of AlO(OH):$H_3BO_3$.

4. The formed body of claim 1, wherein the boron nitride content is at least 15% by weight, based on the total weight of the material composition.

5. The formed body according to claim 1, wherein the formed body has a compressive strength of at least 4 N/mm$^2$, wherein the compressive strength is measured as a maximum force before rupture of a test sample of the formed body, divided by the area of the test sample on which the load is applied.

6. The formed body according to claim 1, wherein the formed body has a Brinell hardness of at least 2 HBW 2.5/2, wherein the Brinell hardness is measured according to DIN EN ISO 6506-1-2013.

7. A process of making a formed body, wherein the process comprises the steps
(a) providing a first powder comprising hexagonal boron nitride powder;
(b) obtaining a second powder comprising the hexagonal boron nitride powder and at least one water-soluble boron compound selected from the group consisting of boric acid ($H_3BO_3$) and ammonium borates, by at least one of:

- (i) generating the at least one water soluble boron compound by mechanically pre-treating the powder of step (a) and
- (ii) by adding the at least one water-soluble boron compound to the powder provided in step (a);

(c) adding boehmite to the second powder of step (b), wherein as expressed as a molar ratio of AlO(OH):$H_3BO_3$, the molar ratio of boehmite to the water-soluble boron compound is from 0.3:1 to 6:1;

(d) mixing the second powder of step (b) and the boehmite added in step (c), thereby obtaining a material composition comprising hexagonal boron nitride;

(e) optionally granulating the material composition of step (d), thereby obtaining a material composition comprising hexagonal boron nitride, wherein the material composition is granulated; and (f) forming the material composition of step (d) or the material composition of step (e) into a shape.

8. A process for making a heat-treated formed body, wherein the process comprises the steps (a) providing a first powder comprising hexagonal boron nitride powder;

(b) obtaining a second powder comprising hexagonal boron nitride powder and at least one water-soluble boron compound selected from the group consisting of boric acid ($H_3BO_3$) and ammonium borates, by at least one of:

- (i) generating the at least one water soluble boron compound by mechanically pre-treating the first powder of step (a) and
- (ii) by adding the at least one water-soluble boron compound to the first powder provided in step (a), thereby;

(c) adding boehmite to the second powder of step (b), wherein as expressed as a molar ratio of AlO(OH):$H_3BO_3$, the molar ratio of boehmite to the water-soluble boron compound is from 0.3:1 to 6:1 the further inorganic compound;

(d) mixing the second powder of step (b) and the boehmite added in step (c), thereby obtaining a material composition comprising hexagonal boron nitride;

(e) optionally granulating the material composition of step (d), thereby obtaining a material composition comprising hexagonal boron nitride, wherein the material composition is granulated; and (f) forming the material composition of step (d) or the material composition of step (e) into a shape, thereby obtaining a formed body; and (g) heat-treating the formed body of step (f) at a temperature of from 200 to 1000° C.

9. A heat-treated formed body obtained by the process of claim 8, wherein the heat-treated formed body comprises hexagonal boron nitride and the reaction product between the water-soluble boron compound and boehmitem, and wherein the reaction product is a water-insoluble boron compound.

10. The heat-treated formed body according to claim 9, wherein the reaction product between the water-soluble boron compound and boehmite is aluminum borate $Al_4B_2O_9$.

11. The heat-treated formed body according to claim 9, wherein the compressive strength of the heat-treated formed body is at least 4 N/mm$^2$, wherein the compressive strength is measured as maximum force before rupture of a test sample of the formed body, divided by the area of the test sample on which the load is applied.

12. The heat-treated formed body according to claim 9, wherein the heat-treated formed body has a Brinell hardness of at least 3 HBW 2.5/2, wherein the Brinell hardness is measured according to DIN EN ISO 6506-1-2013.

13. The heat-treated formed body according to claim 9, wherein the heat-treated formed body has a boron nitride content of at least 15% by weight, based on the total weight of the heat-treated formed body.

* * * * *

UNITED STATES PATENT AND TRADEMARK OFFICE
CERTIFICATE OF CORRECTION

Page 1 of 1

PATENT NO. : 10,954,164 B2
APPLICATION NO. : 16/323454
DATED : March 23, 2021
INVENTOR(S) : Jan Zimmer It is certified that error appears in the above-identified patent and that said Letters Patent is hereby corrected as shown below:

In the Specification

Column 18
Line 30, Delete "(0." and insert -- (f). --, therefor.

In the Claims

Column 32
Line 48, In Claim 3, delete ":H₃B0₃." and insert -- :H₃BO₃. --, therefor.

Column 34
Line 4-5, In Claim 8, delete "6:1 the further inorganic compound;" and insert -- 6:1; --, therefor.
Line 20, In Claim 9, delete "boehmitem," and insert -- boehmite, --, therefor.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*